(12) United States Patent
Pfister

(10) Patent No.: US 9,227,527 B2
(45) Date of Patent: Jan. 5, 2016

(54) ASSISTED RESCUE SYSTEM

(71) Applicant: 2040422 ONTARIO INC., Dorchester (CA)

(72) Inventor: Karl Gerhard Pfister, Thorndale (CA)

(73) Assignee: 2040422 ONTARIO INC., Dorchester, Ontario (CA)

(*) Notice: Subject to any disclaimer, the term of this patent is extended or adjusted under 35 U.S.C. 154(b) by 0 days.

(21) Appl. No.: 14/353,534

(22) PCT Filed: Oct. 24, 2012

(86) PCT No.: PCT/CA2012/000990
§ 371 (c)(1),
(2) Date: Apr. 23, 2014

(87) PCT Pub. No.: WO2013/059921
PCT Pub. Date: May 2, 2013

(65) Prior Publication Data
US 2014/0300154 A1    Oct. 9, 2014

Related U.S. Application Data

(60) Provisional application No. 61/550,682, filed on Oct. 24, 2011.

(51) Int. Cl.
| | | |
|---|---|---|
| *B60R 22/32* | (2006.01) | |
| *B60N 2/02* | (2006.01) | |
| *B60R 22/26* | (2006.01) | |
| *B60N 2/68* | (2006.01) | |
| *B60N 2/24* | (2006.01) | |
| *B60N 2/32* | (2006.01) | |
| *B60N 2/44* | (2006.01) | |
| *B60R 22/02* | (2006.01) | |

(52) U.S. Cl.
CPC .. *B60N 2/02* (2013.01); *B60N 2/24* (2013.01); *B60N 2/32* (2013.01); *B60N 2/44* (2013.01); *B60N 2/688* (2013.01); *B60R 22/26* (2013.01); *B60R 22/32* (2013.01); *B60R 2022/027* (2013.01)

(58) Field of Classification Search
CPC .......... B60R 22/26; B60R 22/32; B60N 2/02; B60N 2/24; B60N 2/32; B60N 2/44; B60N 2/688
USPC .................................... 297/465, 485
See application file for complete search history.

(56) References Cited

U.S. PATENT DOCUMENTS

| | | | | |
|---|---|---|---|---|
| 4,728,119 | A | * | 3/1988 | Sigafoo .................... 297/485 |
| 4,874,203 | A | * | 10/1989 | Henley ................. 297/485 X |
| 4,923,147 | A | | 5/1990 | Adams et al. |
| 5,161,275 | A | * | 11/1992 | Simpson et al. .......... 297/485 |
| 5,934,749 | A | | 8/1999 | Pond et al. |
| 6,250,713 | B1 | | 6/2001 | Grohs et al. |
| 6,550,858 | B1 | | 4/2003 | Grohs et al. |
| 7,100,991 | B2 | | 9/2006 | Schroth |
| 7,293,818 | B2 | | 11/2007 | Kumpf et al. |
| 2006/0243126 | A1 | | 11/2006 | Tyler |

* cited by examiner

*Primary Examiner* — Anthony D Barfield

(57) ABSTRACT

An assisted rescue system to extract a seatbelt harnessed person from a vehicle. The system comprises a seatbelt harness and seat liner which together form a sling. The seatbelt harness is connected at anchor points with a releasable securing mechanism that is operable with a single release action.

12 Claims, 10 Drawing Sheets

ASSISTED RESCUE SYSTEM

FIELD OF THE INVENTION

The present invention relates to an assisted rescue system that will enable the quick and safe extraction of a casualty from a vehicle and provide ongoing protection for the casualty during ensuing transport to a medical facility.

BACKGROUND OF THE INVENTION

One option for removal of an injured person from an armoured vehicle is via the roof hatch. This first requires that the seatbelt be unfastened or cut away from the casualty. Thereafter the casualty is moved using whatever means possible through the hatch opening or any other point of egress.

During rescue operations, time is of course of the essence. Attempting to undo the seatbelt and/or trying to cut away the various sections of the seatbelt, or parts thereof, can be time consuming. It also requires the rescuer to access, reach and apply forces in awkward and tight quarters and from difficult angles in a vehicle already damaged in the attack.

The casualty may have suffered back, neck, spinal cord injuries or other grievous bodily harm. Moving the deadweight of the casualty is difficult, and may additionally cause damage and trauma. There is accordingly a need for extracting a seatbelt harnessed person from the vehicle quickly and efficiently for evacuation to medical faculties.

SUMMARY OF THE INVENTION

An object of the present invention is to unfasten a seatbelt harnessed person from the vehicle while he remains secured and fully supported to enable removal of the person from the vehicle.

Another object of the present invention is to provide a seat liner that can function, together with the seatbelt harness, as a load carrying lifting sling.

Another object of the present invention is to provide a liner that can function as a stretcher.

Another object of the present invention is to provide a comfortable yet light weight seat liner that meets safety regulations and is compatible with all types of vehicle seating.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which.

DESCRIPTION OF THE PREFERRED EMBODIMENTS

Figure 1:
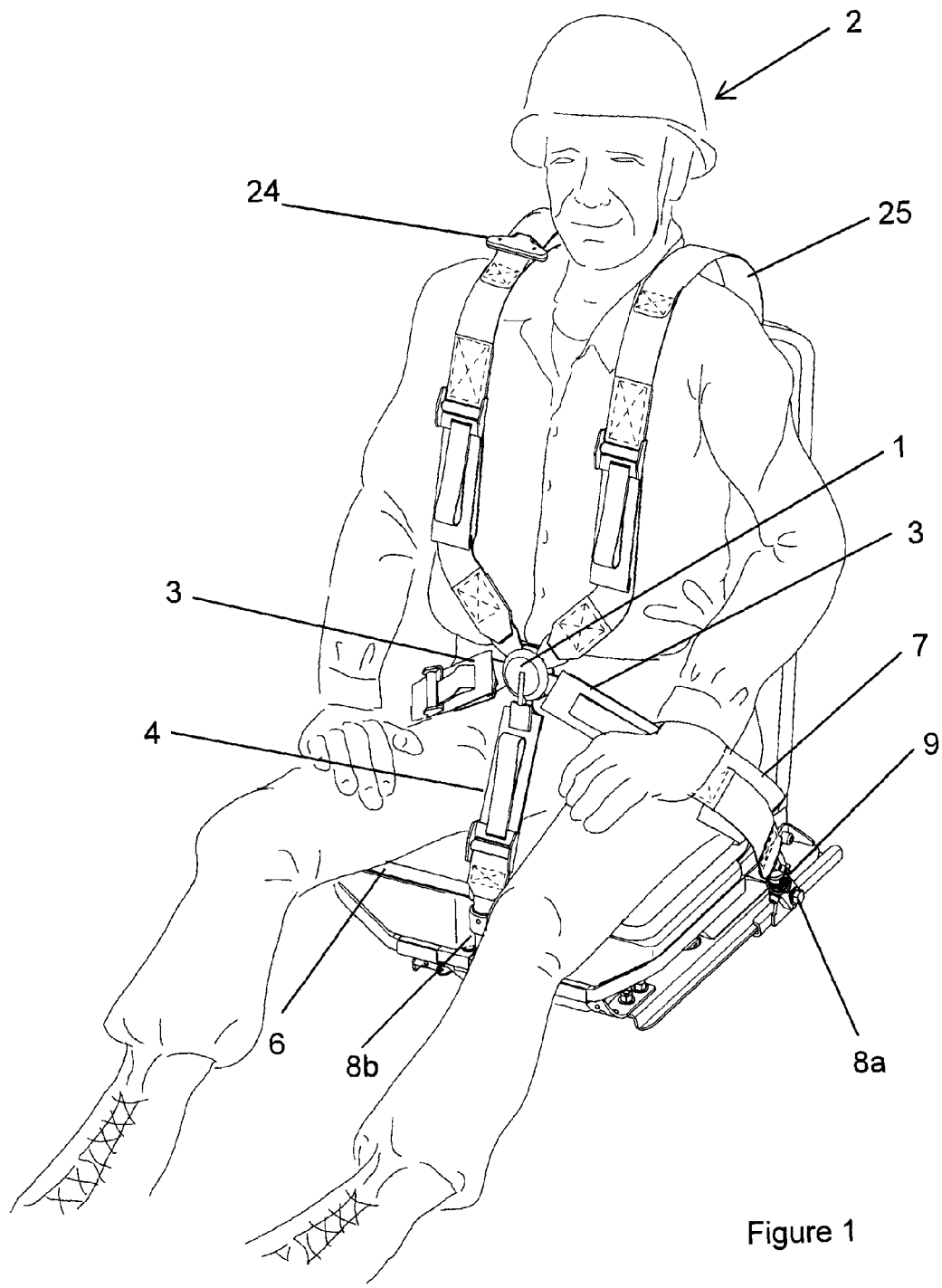
FIG. 1 is a perspective view of the assisted rescue system with a person secured therein.
Figure 2:
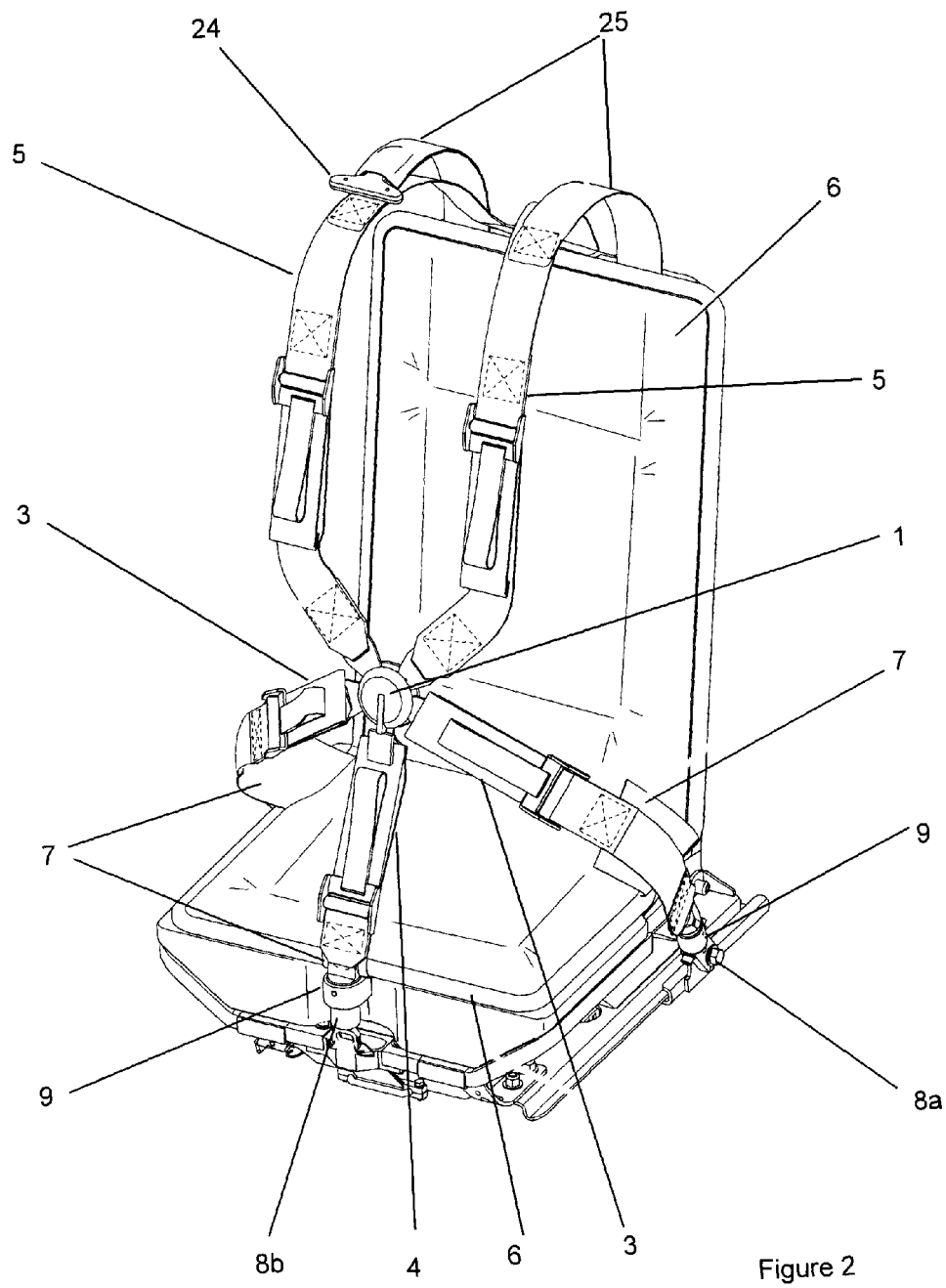
FIG. 2 is a perspective view of the assisted rescue system for a seat.
Figure 3:
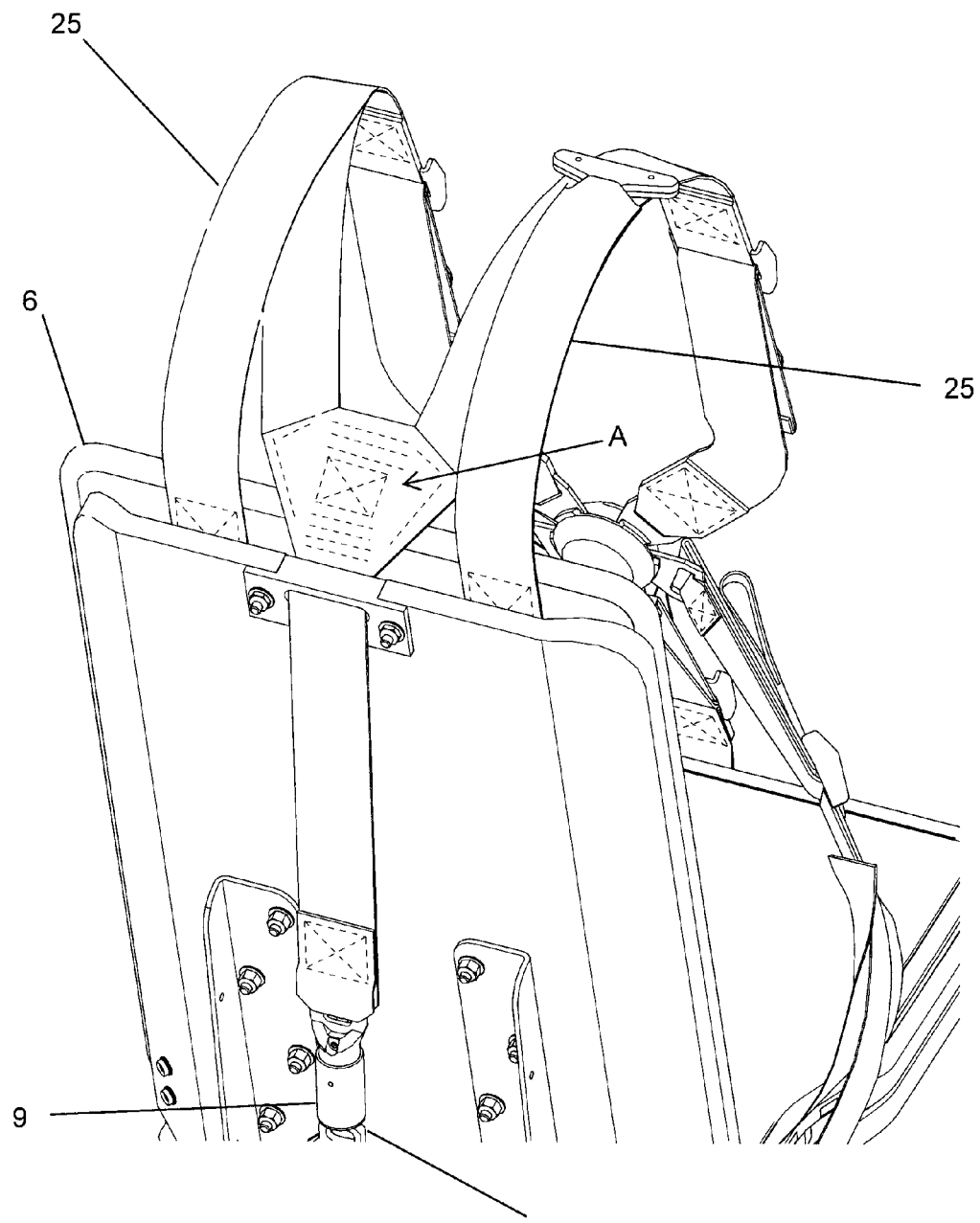
FIG. 3 is a rear perspective view of the assisted rescue system for a seat.
Figure 4:
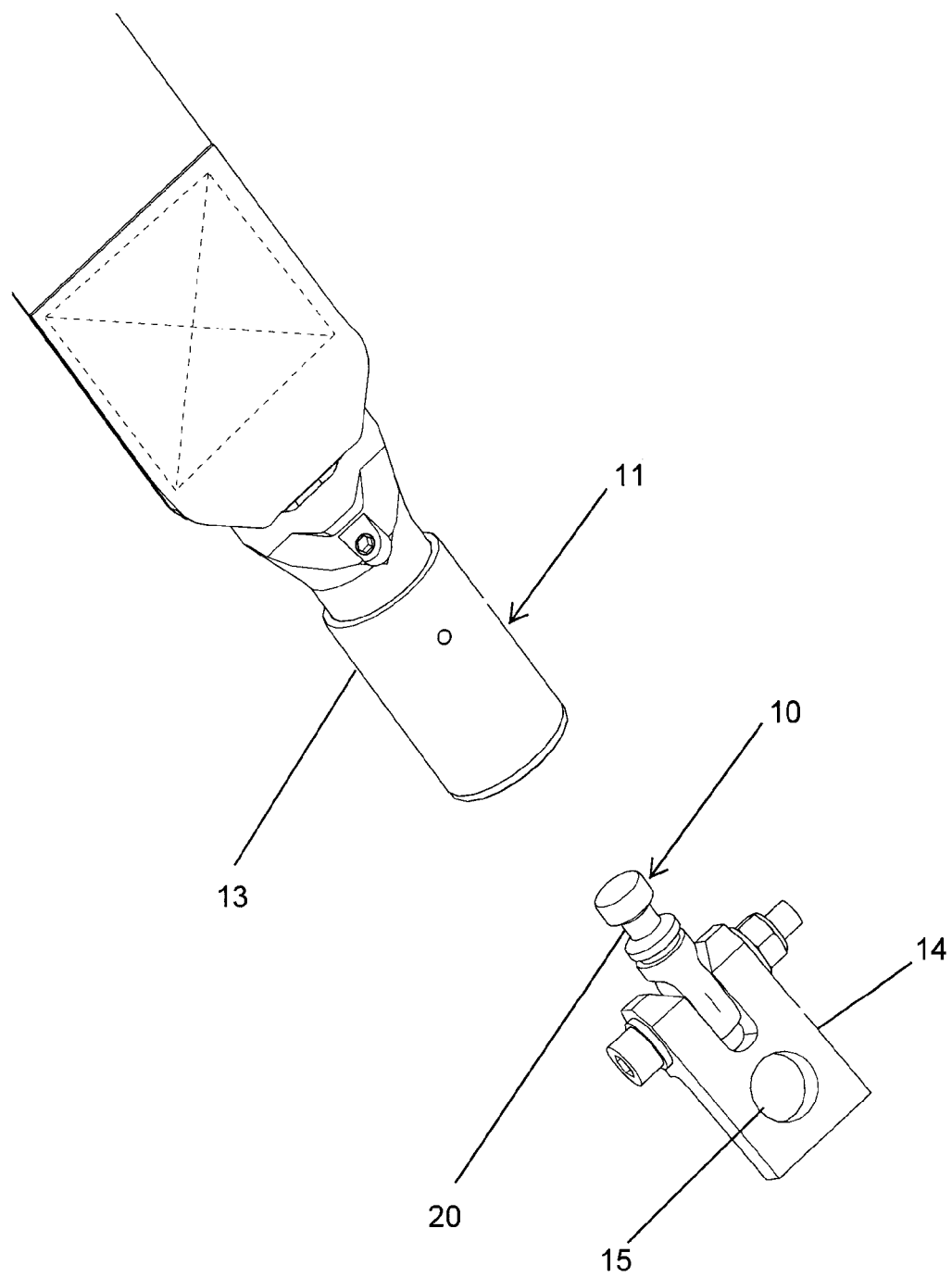
FIG. 4 is a perspective view of the quick release coupling in the open position.

FIGS. 1, 2 and 3 generally illustrate a typical five point seatbelt harness configuration 1 for securing a person 2 in a seat inside a vehicle. The lap belts 3 of the harness are connected to a centre belt 4 between the legs and shoulder belts 5 each requiring attachment to an anchor point on the seat or vehicle frame. In the embodiment shown, the shoulder straps are joined at the back as shown in FIG. 3 at A, thus requiring attachment at four anchor points. In the Figures anchor points 8a for the lap belt (only one shown), 8b for the centre belt and 8c for the shoulder straps are illustrated by way of example. The assisted rescue system according to this invention operates to release the seatbelt harness at every anchor point from a remote location in response to a single release action as will be hereafter described.

Referring to FIG. 1, a person 2, as for example an operator of the vehicle, is seatbelt harnessed to the seat as is required by standard operating procedures. Typically, in military vehicles there is provided an overhead exit/entry hatch(s) above the operator (not shown) through which an incapacitated person may be optionally accessed for removal and evacuation.

According to the present invention a removable seat cushion or liner 6 is interposed between the person and the seat. The liner is not attached to the seat in any way but is attached to the seat belt harness at all locations 7 where the seatbelts are proximate to the periphery of the liner. The connection between the shoulder straps and liner may take the form of shoulder straps 25 which may be used as lifting handles. Any suitable method of attachment may be used such as stitching a length of strap material to the seat belt and liner and thereby permanently attaching one to the other. It can be appreciated that the attachment location between the seatbelt and liner is at any suitable intermediate location short of the anchor point such that the release of the seatbelt harness at the anchor points does not affect the permanent connection between the seatbelt and the liner. Accordingly, release of the seatbelt harness at the anchor points releases the person from the vehicle but not the harness. The person remains secured and fully supported in the harness.

The liner can later function as a stretcher and for this purpose may be provided with handles for carrying the person. The handles may be in the form of slots along the sides of the liner 6 or lifting handles attached to the sides of the liner. The back and seat cushion of the seat liner may be reinforced to add spinal support during removal of the person and improve its function and use as a stretcher. The back surface of the liner should be smooth to permit sliding over vehicle surfaces and thus facilitate the removal of the person without snagging. Once released from the anchor points, the seatbelt harness, together with the liner, serves to secure the person in a sling or lifting harness for all purposes of egress of the vehicle. In the embodiment shown, the shoulder straps 25 may be used as lifting handles to lift the person out of the vehicle.

Each anchor point is provided with a quick release mechanism 9 operable in response to an external manual release action located at a central position. In the embodiment shown the release action is initiated by a first responder by pulling the handle 24 located at the top near the person's shoulder. The handle is centrally connected by means of cables to the quick release mechanisms. This location for the handle allows the first responder to quickly and easily unfasten the person from the vehicle by reaching inside the vehicle through the overhead access point to pull the handle.

Figure 6:
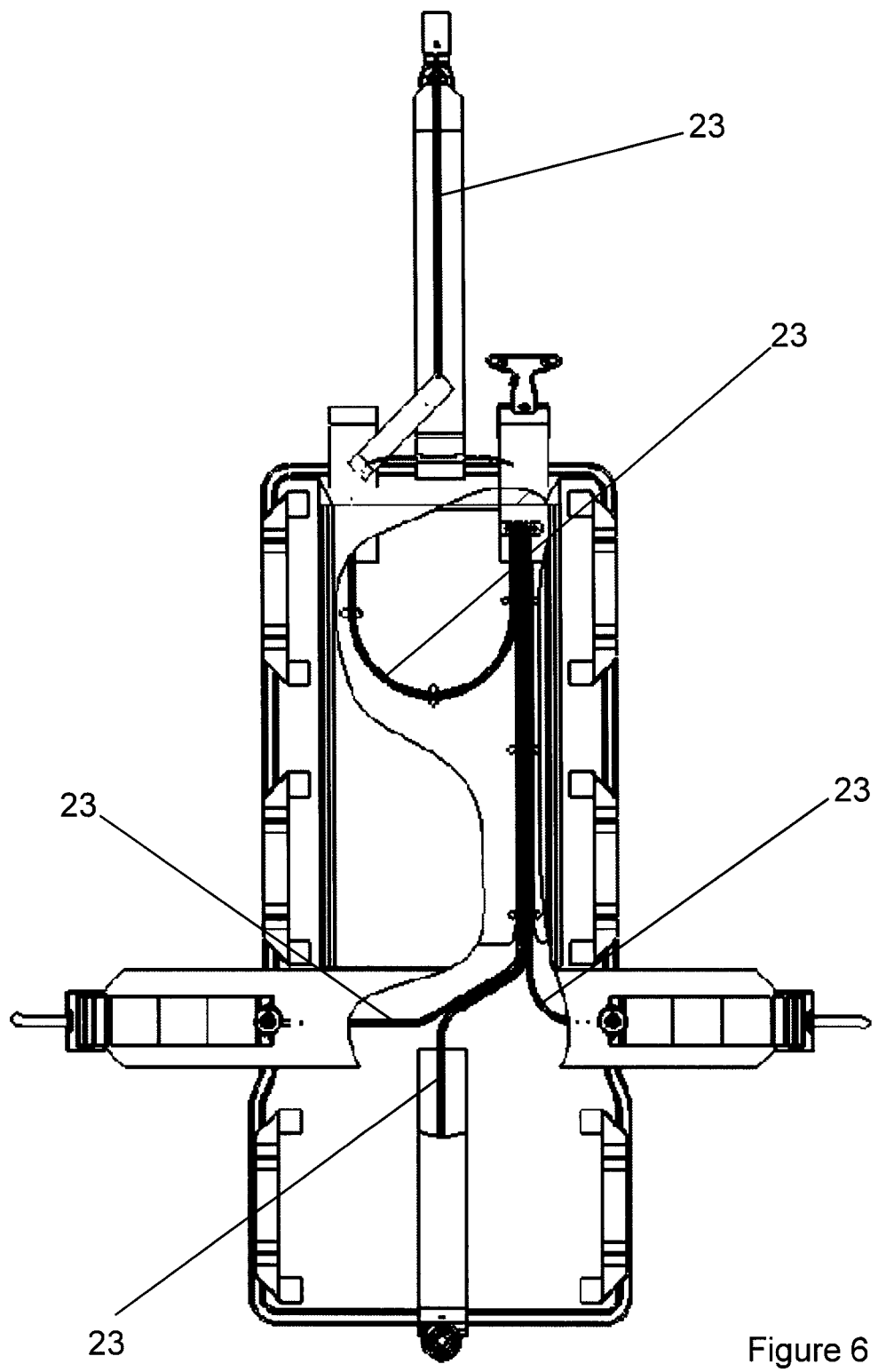
FIG. 6 is a schematic view of a four anchor point cable configuration for a seat.
Figure 11:
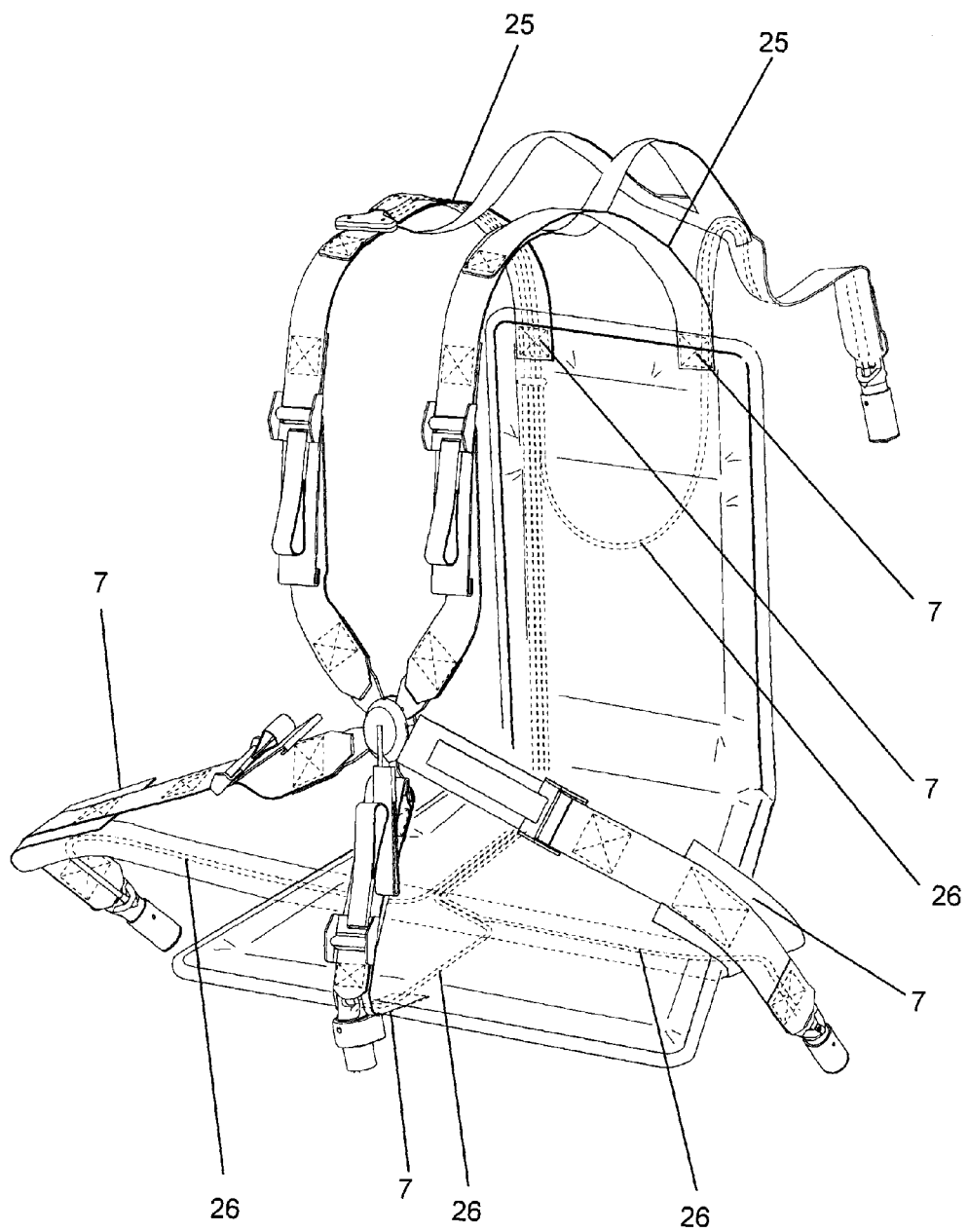
FIG. 11 is an exploded view of the assisted rescue system comprising a seatbelt harness attached to a seat liner.

Any known operated quick release mechanism may be used to carry out the purposes of this invention. The quick release mechanism in the preferred embodiment is a cable operated coupling comprising a male connector and a female socket. The cable is connected to the socket on each coupling and all the cables are arranged to be activated by release pull action at one location. Accordingly, pulling the handle results in a like pulling action at the socket to thereby release the connector. As shown in FIG. 6, the cables are sheathed in a conduit 23 and suitably routed so that the cable movement is smooth and not interfered with. A schematic illustration of a four anchor point cable configuration is shown in FIG. 6. FIG. 11 illustrates the cable routing with dotted lines 26.

Figure 5:
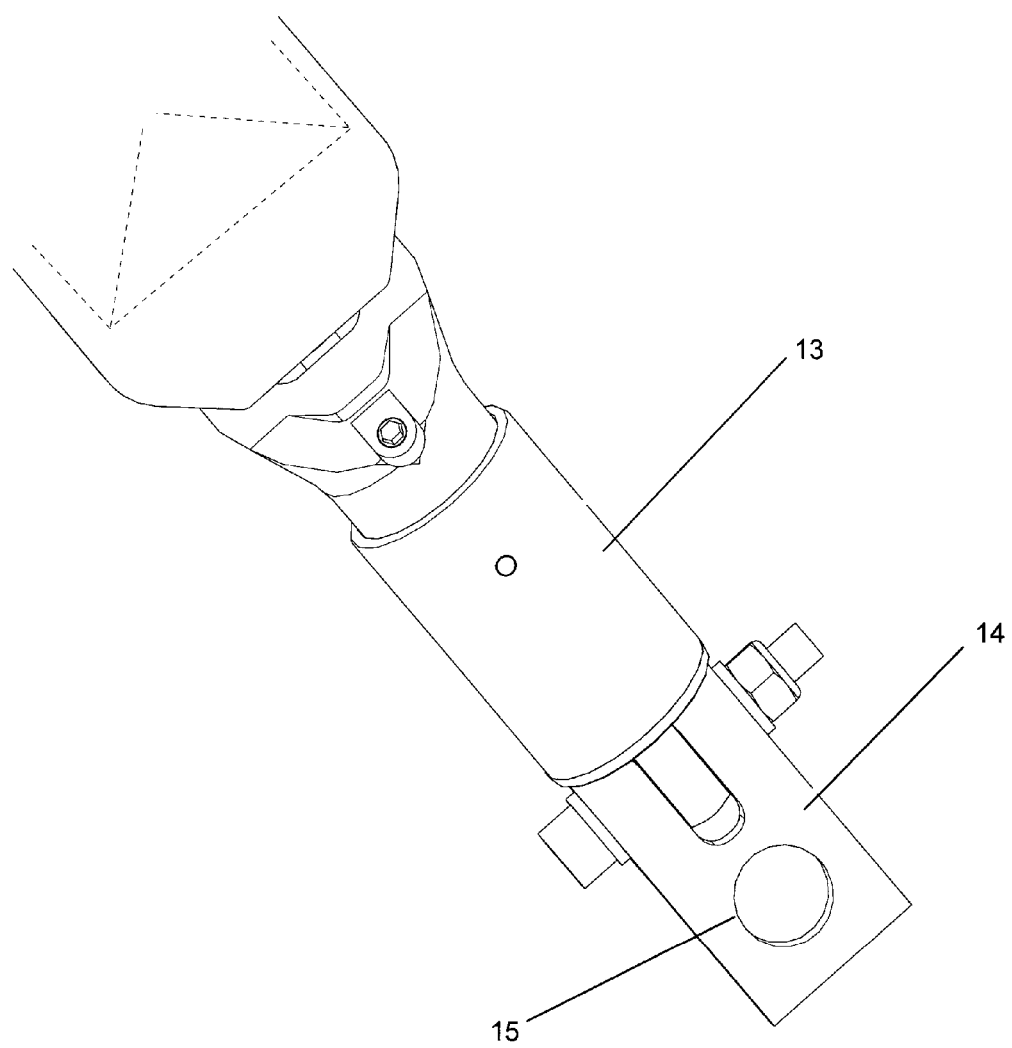
FIG. 5 is a perspective view of the quick release coupling in the closed position.
Figure 7:
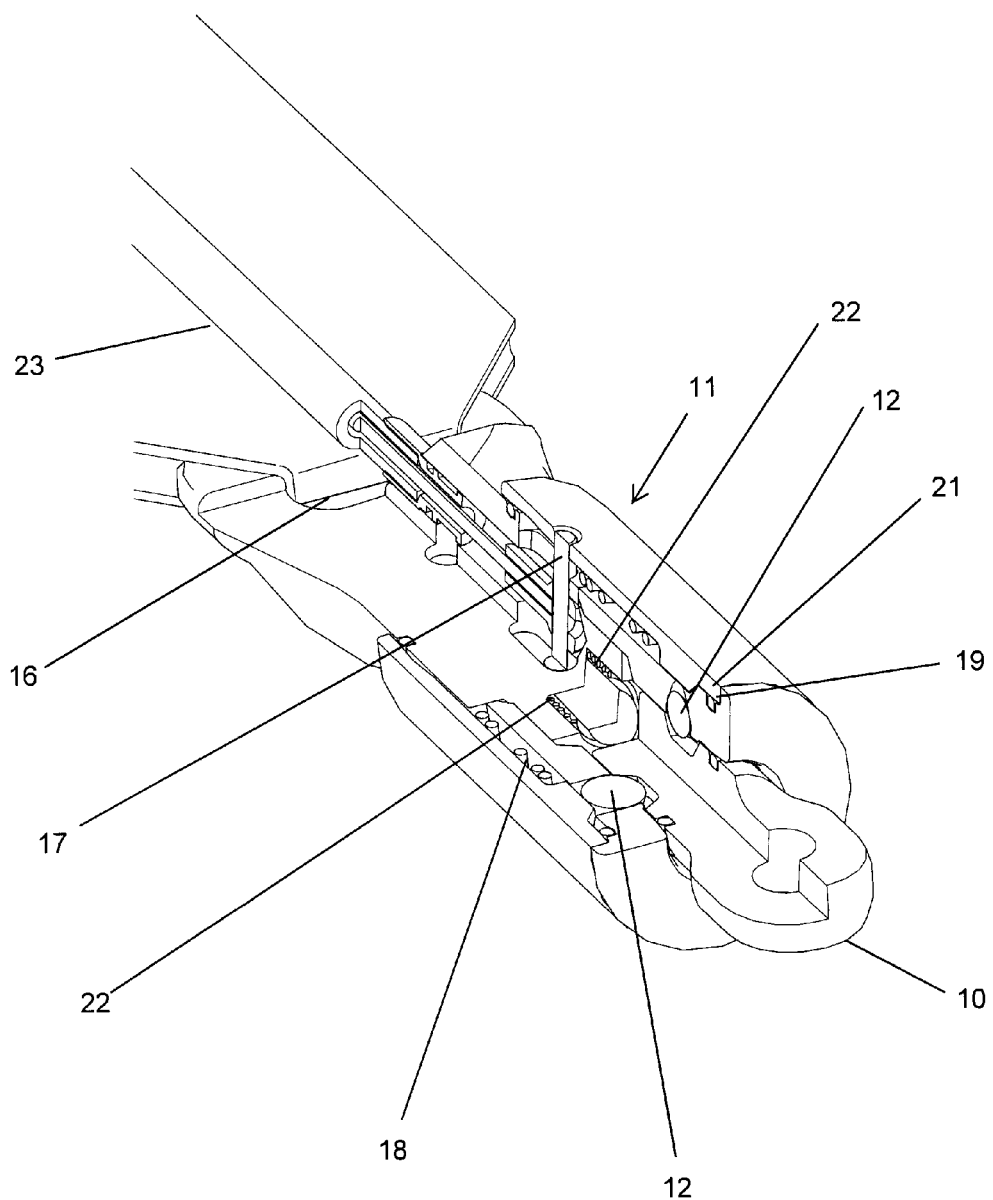
FIG. 7 is a perspective partly sectional view of the quick release coupling in the closed position.
Figure 8:
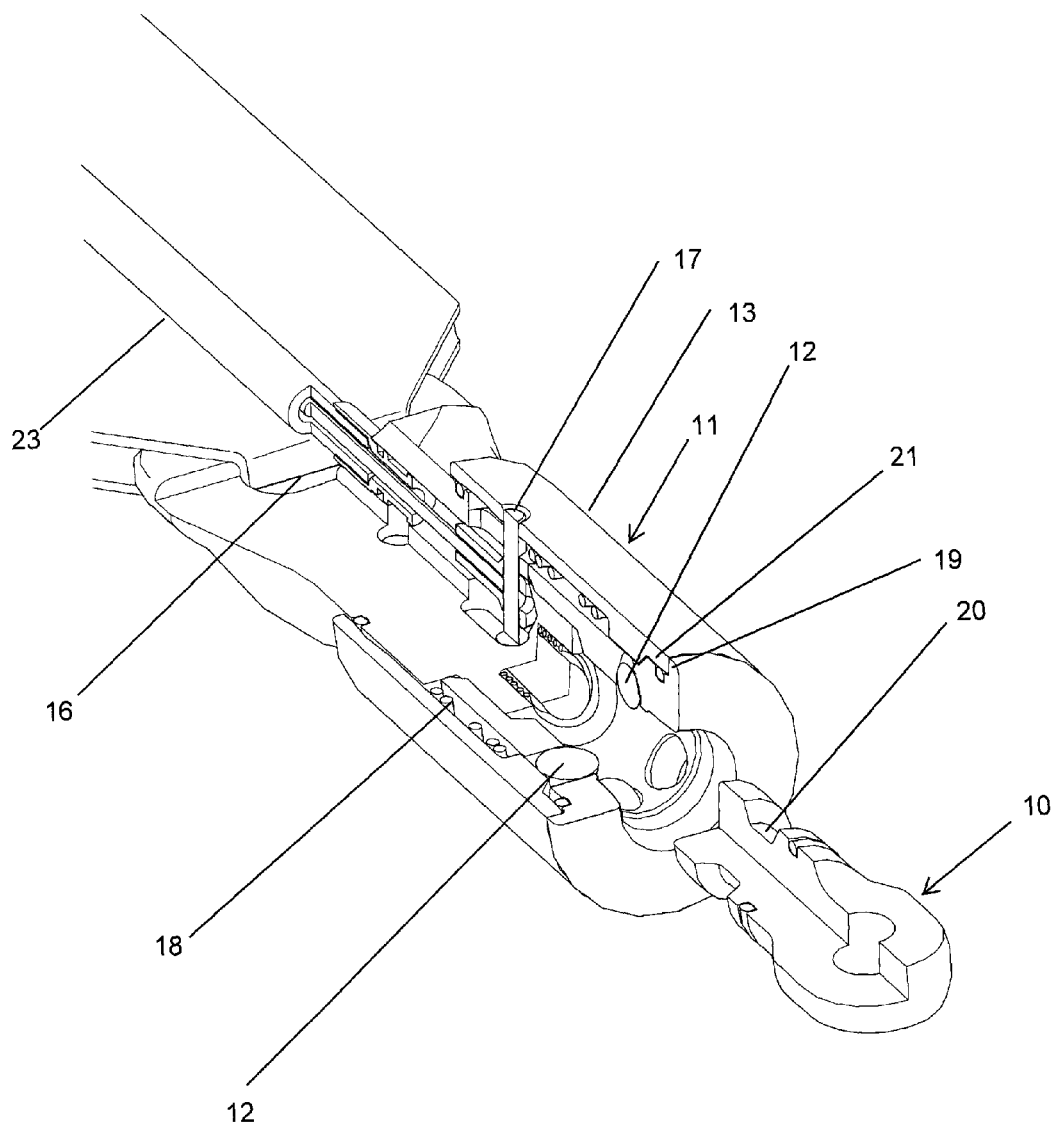
FIG. 8 is a perspective partly sectional view of the quick release coupling in the open position.
Figure 10:
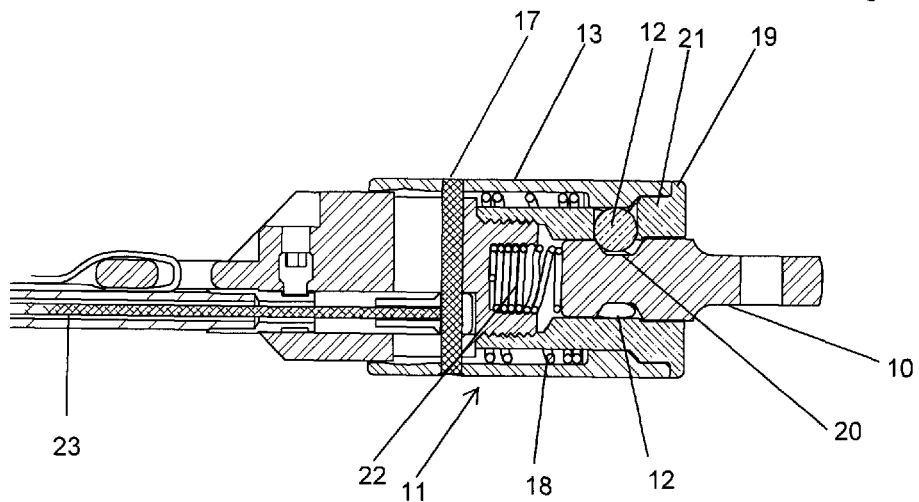
FIG. 10 is a side sectional view of the quick release coupling in the closed position.

The operation of the quick release coupling is illustrated in FIGS. 4, 5, 7 and 8. It comprises of a male connector 10 and a female socket 11. As is shown, ball bearings 12 inside the socket retain and lock the connector therein as shown in FIGS. 5, 7 and 10. The connector is released by retracting an outer sleeve 13 on the socket which allows the connector to disconnect from the socket by releasing the ball bearings from their locking engagement against the inner surface of the sleeve 13.

The male connector 10 is pivotally attached to an anchor flange 14 for attachment to the anchor point by means of a bolt attachment passing through the aperture 15. The socket has an elongated slot 16 for attachment to the seatbelt and acts to receive and lock the connector thereby releasably attaching the seatbelt to the anchor point.

Referring to FIGS. 7, 8, 9 and 10, the cable enters the socket and is connected to a sliding pin 17 inside the socket which, in turn, is connected at each end to the sleeve as shown. In the closed position, the sleeve is biased outwardly to keep the coupling closed. Circumferential spring 18 ordinarily maintains the sleeve in the closed position against the stop 19. In the closed position the connector is locked within the socket by means of ball bearings 12 that engage a circumferential groove 20 in the connector end.

Figure 9:
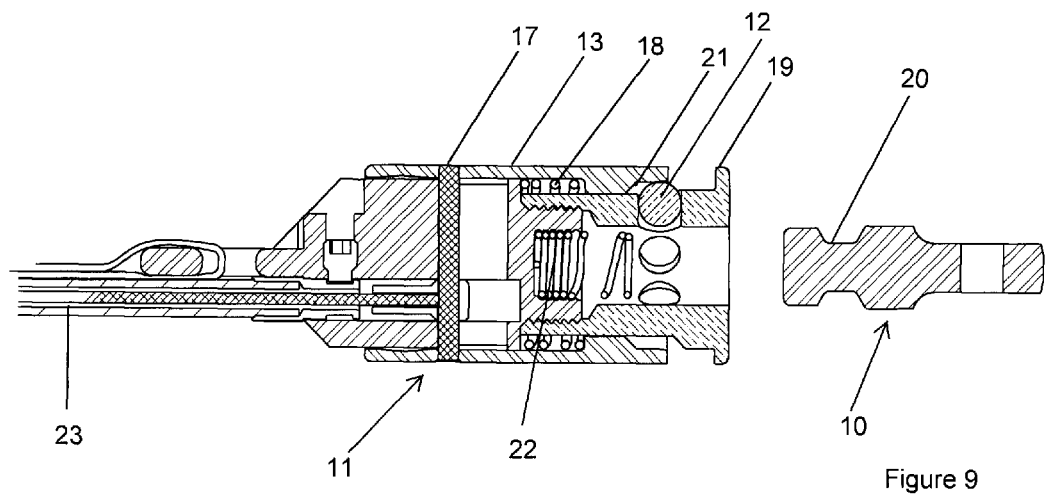
FIG. 9 is a side sectional view of the quick release coupling with the socket in the release position and the connector released from the socket.

The pull action on the handle retracts the sleeve rearwardly to the open position as shown in FIG. 9. In the open position the ball bearings are free to move upwardly as they are no longer restrained by the inner surface of the sleeve. With the sleeve retracted, a ball bearing 12 receiving channel 21 provided on the inner surface of the sleeve allows the ball bearings to freely move upwardly in response to a disconnecting axial force on the connector. The axial force is provided by internal spring 22 that acts to eject the connector from the socket past the ball bearings ensuring an affirmative release of the coupling and consequent release of the seatbelt from the anchor point. With this arrangement an axial pulling force of about 20 lbs. ensures rapid release at the anchor points.

In principle, any suitable quick release mechanism operable in response to a mechanical or electrical release action is suitable. The requirement is that the central release location for initiating the release be proximate to and available for use by a first responder. In the preferred embodiment the release handle is located at or near the person's shoulder and is accessible via the exit hatch on the roof of the vehicle.

The assisted rescue system according to this invention may be retrofitted as an accessory for existing vehicle seating configurations or supplied as original equipment. The system is easily and readily resettable if released accidentally or intentionally. It may be manually reset by retracting the sleeve and inserting the connector into the socket for closure.

Other advantages which are inherent to the invention are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed:

1. An assisted rescue system for extracting a seat belt harness restrained person from a vehicle, comprising:
   a removable seat liner;
   a seatbelt harness for securing a person seated on the liner;
   said harness releasably secured to a plurality of anchor points on the vehicle by means of a releasable securing mechanism at each anchor point;
   said seat harness permanently secured to the liner;
   wherein all the securing mechanisms are operable by a single release action to thereby release the harness from the anchor points and thereby permit the removal of the person by means of the harness from the vehicle through an access point.

2. The invention as claimed in claim 1 wherein said release action is either manual or electrical.

3. The invention as claimed in claim 2 wherein said harness has shoulder straps for manual grasping and lifting the harness.

4. The invention as claimed in claim 3 wherein said manual release action is a cable pull, and
   wherein said securing mechanism is a quick release coupling connected to a cable and is operable to release in response to the cable pull.

5. The invention as claimed in claim 4 wherein said quick release coupling comprises a female socket connected to the harness and a male connector connected to the anchor point or vice-versa.

6. The invention as claimed in claim 3 wherein said electrical release action is an electrical signal and wherein said securing mechanism is a quick release coupling operable to release in response to the electrical signal.

7. The invention as claimed in claim 6 wherein said quick release coupling comprises a female socket connected to the harness and a male connector connected to the anchor point or vice versa.

8. The invention as claimed in claim 4 or 6 wherein said liner comprises a seat portion and back portion.

9. The invention as claimed in claim 8 wherein said seat and back portions are reinforced.

10. The invention as claimed in claim 9 wherein said liner has handle means on each side for use as a stretcher.

11. The invention as claimed in claim 4 or 6 wherein said assisted rescue system may be retrofitted on existing vehicle seating.

12. The invention as claimed in claim 4 or 6 wherein said securing mechanism is manually resettable after release.

* * * * *